(12) United States Patent  
Andresen et al.

(10) Patent No.: US 9,201,089 B2  
(45) Date of Patent: Dec. 1, 2015

(54) FIBER OPTICAL ACCELEROMETER

(75) Inventors: Søren Andresen, København Ø (DK); Torben Rask Licht, Holte (DK)

(73) Assignee: Brüel & Kjær Sound & Vibration Measurement A/S, Nærum (DK)

(*) Notice: Subject to any disclaimer, the term of this patent is extended or adjusted under 35 U.S.C. 154(b) by 382 days.

(21) Appl. No.: 13/696,933

(22) PCT Filed: May 10, 2011

(86) PCT No.: PCT/EP2011/057467  
§ 371 (c)(1), (2), (4) Date: Jan. 10, 2013

(87) PCT Pub. No.: WO2011/141445  
PCT Pub. Date: Nov. 17, 2011

(65) Prior Publication Data  
US 2013/0104655 A1   May 2, 2013

Related U.S. Application Data

(60) Provisional application No. 61/333,409, filed on May 11, 2010.

(51) Int. Cl.  
G01P 15/093 (2006.01)  
G01H 9/00 (2006.01)  
G01P 1/02 (2006.01)

(52) U.S. Cl.  
CPC .............. *G01P 15/093* (2013.01); *G01H 9/004* (2013.01); *G01P 1/023* (2013.01)

(58) Field of Classification Search  
CPC ....... G01H 9/004; G01P 15/093; G01P 1/023; G01P 15/08  
USPC ........ 73/514.16, 514.26, 514.27; 250/227.16, 250/227.18, 227.19  
See application file for complete search history.

(56) References Cited

U.S. PATENT DOCUMENTS 6,891,621 B2   5/2005  Berg et al.  
7,661,313 B2 *  2/2010  Maguire et al. ............ 73/514.16  
(Continued)

FOREIGN PATENT DOCUMENTS

CN   101285845 A   10/2008  
CN   101344533 A    1/2009  
(Continued)

OTHER PUBLICATIONS

English translation of Office Action corresponding to co-pending Chinese Patent Application Serial No. 201180023665.9, Chinese State Intellectual Property Office of P.R.C., dated Jan. 13, 2014; (6 pages).

(Continued)

*Primary Examiner* — Helen Kwok  
(74) *Attorney, Agent, or Firm* — Nixon Peabody LLP

(57) ABSTRACT

A fiber optical accelerometer comprising a base structure, a first seismic mass movably coupled to the base structure through a first hinge element, a second seismic mass movably coupled to the base structure through a second hinge element, an optical fiber coupled to the first and second seismic masses at first and second attachment joints, respectively, to subject the optical fiber to varying strain by displacement of the first and second seismic masses about the first and second hinge structures, respectively.

16 Claims, 6 Drawing Sheets

(56) References Cited

U.S. PATENT DOCUMENTS

| | | | |
|---|---|---|---|
| 7,802,474 B2 * | 9/2010 | Maguire et al. | 73/514.16 |
| 2007/0189658 A1 * | 8/2007 | Maas | 385/12 |
| 2009/0114031 A1 * | 5/2009 | Maguire et al. | 73/760 |
| 2010/0024551 A1 | 2/2010 | Maguire et al. | |

FOREIGN PATENT DOCUMENTS

| | | |
|---|---|---|
| JP | 2004-528538 A | 9/2004 |
| JP | 2005-534891 A | 11/2005 |
| JP | 2010-078489 A | 4/2010 |
| JP | 2010078489 A | 4/2010 |
| WO | WO 02/063248 A2 | 8/2002 |

OTHER PUBLICATIONS

Search Report corresponding to co-pending Chinese Patent Application Serial No. 201180023665.9, Chinese State Intellectual Property Office of P.R.C., dated Nov. 6, 2013; (2 pages).

International Search Report corresponding to co-pending International Patent Application Serial No. PCT/EP2011/057467, European Patent Office, dated Jul. 14, 2011; (4 pages).

International Written Opinion corresponding to co-pending International Patent Application Serial No. PCT/EP2011/057467, European Patent Office, dated Jul. 14, 2011; (8 pages).

* cited by examiner

FIBER OPTICAL ACCELEROMETER

CROSS-REFERENCE TO RELATED APPLICATIONS

This application is a U.S. National Stage of International Application No. PCT/EP2011/057467, filed May 10, 2011, which claims the benefit of U.S. Provisional Application No. 61/333,409, filed on May 11, 2010, both of which are incorporated herein by reference in their entireties.

FIELD OF THE INVENTION

The present invention relates in one aspect to a fibre optical accelerometer comprising first and second seismic masses movably coupled to a base structure through respective hinge elements. An optical fibre is coupled to the first and second seismic masses so as to subject the optical fibre to varying strain by displacement of the first and second seismic masses about the first and second hinge structures, respectively.

BACKGROUND OF THE INVENTION

Fibre optical accelerometers for robust remote sensing of structural vibration or acceleration are known in the art. Fibre optical accelerometers posses several desirable properties such as insensitivity to electromagnetic and mechanical interference, good multiplexing capability and support of extended lengths of connecting cabling. These properties make fibre optical accelerometers a first choice for many special applications such as wind energy, oil and gas exploration, aerospace etc where remote and harsh environments often prevail.

U.S. Pat. No. 6,891,621 B2 discloses a highly sensitive accelerometer for harsh environments. The accelerometer includes a seismic mass coupled to a base by a hinge. The seismic mass performs pendulum motion around the hinge in response to horizontal force applied to the accelerometer. A pair of optical fibres is interconnected between the base and a housing of the accelerometer in a manner such that the optical fibres are alternatingly strained and compressed during application of horizontal force to the accelerometer.

However, there exists a need in the art to provide improved fibre optical accelerometers that can be manufactured at lower costs or with higher measurement accuracy such as improved operational bandwidth and dynamic range.

SUMMARY OF INVENTION

According to a first aspect of the invention, there is provided a fibre optical accelerometer comprising:
- a base structure,
- a first seismic mass movably coupled to the base structure through a first hinge element,
- a second seismic mass movably coupled to the base structure through a second hinge element,
- an optical fibre coupled to the first and second seismic masses at first and second attachment joints, respectively, to subject the optical fibre to a varying strain by displacement of the first and second seismic masses about the first and second hinge structures, respectively.

The first and second hinge elements ensure that the displacement of the first and second attachment joints in response to acceleration is oppositely directed. The first and second seismic masses therefore cooperate to either strain or compress the optical fibre with the same force as provided by displacement of a single seismic mass with a mass equal to the sum of the first and second seismic masses. However, due to the independent movement of the first and second seismic masses, a higher high frequency resonance can be achieved in the present fibre optical accelerometer leading to a larger operating frequency range. In addition, a sensitivity of the fibre optical accelerometer is doubled relative to a accelerometer with a single seismic mass because both the first and second seismic masses impart strain to the fibre optical fibre in response to acceleration.

The present fibre optical accelerometer may comprise an optical read-out mechanism indicating measured acceleration. In one such embodiment, a section of the optical fibre extending between the first and second attachment joints comprises a Fibre Bragg grating (FBG). The FBG is used to indicate the strain of the optical fibre as a measure of the accelerometer acceleration along a predetermined axis. In this embodiment, the optical fibre may be pre-tensioned so that a predetermined level of strain is imparted to the optical fibre under quiescent condition, i.e. zero acceleration. Under acceleration, the induced level of strain in the fibre region comprising the FBG varies dynamically around the predetermined level of strain in accordance with the instantaneous acceleration. This leads to a corresponding alternating level of strain in the strained fibre region which can be detected by measuring a wavelength change of reflected light from the FBG.

Another embodiment, also utilizing an optical read-out mechanism, comprises a Fabry-Pérot resonator defined by two FBGs placed outside the strained fibre region between the first and second attachment joints e.g. outwardly on each side of the attachment joints. For such interferometer based optical accelerometers, as well as the above-described single FBG, the optical detection scheme may rely on demodulation of either light intensity, light wavelength or even the optical phase of the transmitted or reflected light.

The present fibre optical accelerometer is preferably packaged in a hermetically sealed transducer housing to shield movable and sensitive internal components from pollutants of the external environment. A pair of optical connectors may conveniently be integrated with the transducer housing to provide a detachable and versatile fibre optical accelerometer.

In one embodiment, the first and second hinge elements are arranged in a common horizontal plane. In addition, a center of gravity of the first seismic mass and a center of gravity of the second seismic mass are preferably arranged in the common horizontal plane. The placement of the respective centers of gravity of the first and second seismic masses in the same horizontal plane as the first and second hinge elements serves to reduce cross-axial sensitivity, i.e. sensitivity to acceleration in direction perpendicular to the intended sensitivity axis of the fibre optical accelerometer. This reduction of cross-axial sensitivity is accomplished because displacement of the first and second seismic masses relative to the base structure is largely prevented for acceleration along the common horizontal plane.

According to an advantageous embodiment of the invention, the first and second seismic masses, the first and second hinge elements and the base structure are formed in the same material. The first and second seismic masses, the first and second hinge elements and the base structure may be moulded to form a coherent core of a fibre optical accelerometer. The first and second seismic masses, the first and second hinge elements and the base structure may alternatively be fabricated from a single solid object by machining processes such as milling or cutting. Due to the coherent or unitary structure of the fibre optical accelerometer core, a cost-effective fabrication and assembly methodology is provided. Furthermore, key performance metrics of the fibre optical accelerometer such as sensitivity, operational frequency range and dimensions can be tailored or adapted to specific applications in a highly efficient manner by simply changing appropriate dimensions of one or more of the first and second seismic masses, the first and second hinge elements and the base structure. In addition, or in alternative, the material in which the first and second seismic masses, the first and second hinge elements and the base structure are formed may be changed to adapt the key performance metrics to desired target metrics.

The first and second seismic masses, the first and second hinge elements and the base structure may be provided in a metallic material such as a metal selected from a group of {Wolfram, stainless steel, brass, copper, titanium, silicon}.

According to one embodiment of the invention, the first and second hinge elements comprise respective incisions or pinches in the first and second seismic masses adjacent to the base. These incisions may be created in a efficient manner by conventional milling or cutting techniques. Furthermore, the physical characteristics of these incisions can be modified, for example in terms of width and/or height, and thereby adapt the performance metrics of the fibre optical accelerometer to specific target metrics in a fast and cost-efficient manner.

According to yet another embodiment of the invention, a first lever extends between the first seismic mass and the first attachment joint on the optical fibre, and a second lever extends between the second seismic mass and the second attachment joint on the optical fibre. The first and second levers provide strain force amplification so as to increase a level of strain applied to the optical fibre section between first and second attachment joints by a certain displacement of the first and second seismic masses about the first and second hinge structures. The amount of strain force amplification is dependent on a first distance ratio. The first distance ratio is set as a distance between the first attachment joint on the optical fibre and the first hinge element relative to a distance between a center of gravity of the first seismic mass and the first hinge element. This first distance ratio may be larger than two or three or five. Preferably, the corresponding, or second, distance ratio pertinent to the distance between the second attachment joint and the second hinge element relative to the distance between the center of gravity of the second seismic mass and the second hinge element is substantially identical to the first distance ratio.

Each of the first and second levers may be provided as separate elements attached or coupled to the respective seismic masses by a suitable attachment mechanism or may alternatively be formed integrally with the respective seismic masses for example by machining of the previously discussed single solid object.

Core components of the present fibre optical accelerometer are preferably arranged symmetrically around a central vertical plane extending through the fibre optical accelerometer. In one embodiment the first and second seismic masses, the first and second hinge elements and the base structure are symmetrically arranged about a central vertical plane. This simplifies manufacturing, provides more uniform frequency response and minimizes sensitivity to acceleration along other axes than the intended sensitivity axis.

According to one embodiment of the present fibre optical accelerometer, which is particularly well-suited for low-cost manufacturing the first and second seismic masses are arranged above a common horizontal plane of the first and second hinge elements toward the optical fibre and the base structure is arranged below the common horizontal plane. As previously explained, the first and second hinge elements may be formed as respective incisions or pinches in the first and second seismic masses adjacent to, or extending into, the base structure such that the incisions themselves define physical separations or boundaries between the first and second seismic masses and the base structure.

The present fibre optical accelerometer may be provided or manufactured with highly variable dimensions depending on constraints and desired performance metrics of a particular type of vibration measurement application. In one embodiment, a maximum dimension of the base structure in a horizontal plane lies between 4 mm and 40 mm, preferably between 8 mm and 20 mm. The fibre optical accelerometer may have a maximum dimension along a vertical axis between 8 mm and 80 mm such as between 10 mm and 15 mm.

A mass of the fibre optical accelerometer will generally follow its dimensions so that increasing dimensions leads to increasing accelerometer mass. A number of useful embodiments have accelerometer masses between 2 grams and 400 grams such as between 5 grams and 100 grams. These preferred accelerometer mass ranges specify the mass for a packaged operative fibre optical accelerometer which usually comprises a transducer housing and possibly one or more fibre optical connectors.

The fibre optical accelerometer preferably comprises the above-mentioned transducer housing enclosing and sealing the first and second seismic masses and the first and second hinge elements against an external environment. The transducer housing is preferably hermetically sealed against the external environment so as to encapsulate and shield movable and fragile inner components of the fibre optical accelerometer, such as the above-mentioned first and second seismic masses and the first and second hinge elements, from pollutants of the external environment. The transducer housing may be attached to the base structure by an appropriate attachment mechanism such as screwing, gluing, welding, crimping, press-fitting, soldering etc.

The transducer housing may comprise or support one or more optical fibre connectors to optically couple the strained optical fibre region inside the packaged fibre optical accelerometer to an external remote broadband light source for acceleration read-out purposes. Each of the optical fibre connectors may be enclosed within respective ones of protective elastomeric bushings shielding the optical fibre connectors against external strain, stress and the pollutants. Finally, the transducer housing may support buffered lengths of optical fibre situated between the strained portion of the optical fibre (sensing element) and each of the optical fibre connectors.

A second aspect of the invention relates to a fibre optical accelerometer comprising:
 a base structure,
 a first seismic mass movably coupled to the base structure through a first hinge element,
 an optical fibre coupled between the first seismic mass at a first attachment joint and a second attachment joint to subject the optical fibre to varying strain by displacement of the first mass about the first hinge structure. The first seismic mass, the first hinge element and the base structure are fabricated from a single solid object by moulding, etching or machining.

In accordance with this second aspect of the invention, the first seismic mass, the first hinge element and the base structure are fabricated from a single solid object by moulding, etching or machining. Due to the unitary structure of a core of the fibre optical accelerometer, a cost-effective fabrication and assembly methodology is provided. Furthermore, important performance metrics or figures such as sensitivity, operational frequency range or dimensions may be tailored to specific applications in a highly efficient manner simply by changing appropriate dimensions of one or more of the first seismic mass, the first hinge element and the base structure. In addition or alternative, the material in which the first seismic mass, the first hinge element and the base structure is formed may be tailored to meet the performance metrics or constraints imposed by a particular application. A change of dimensions of the relevant component(s) of the present fibre optical accelerometer may conveniently be carried out by modifying appropriate parameters of a programmable numerically controlled milling machine. One example of the effectiveness of this adaptation methodology, where dimensions of the hinge elements are modified, is explained below in further detail in connection with the description accompanying FIG. 5.

According to a preferred embodiment, the fibre optical accelerometer further comprises a second seismic mass movably coupled to the base structure through a second hinge element where the optical fibre is coupled to the second seismic mass through the second attachment joint. By mounting the optical fibre between two seismic masses, the displacement of the first and second attachment joints in response to acceleration may be oppositely directed by appropriate accelerometer design. In the latter embodiment, the first and second seismic masses therefore cooperate to either strain or compress the optical fibre with the same force as provided by displacement of a single seismic mass with a mass equal to the sum of the first and second seismic masses as previously explained. Clearly, the features of the various invention embodiments discussed above in relation to the first aspect are also useful in a fibre optical accelerometer with two independently moveable seismic masses according to the second aspect of the invention. In one such embodiment, the first and second hinge elements of the fibre optical accelerometer are arranged in a common horizontal plane.

A third aspect of the invention relates to a method of detecting acceleration of a remote vibratory structure with a fibre optic accelerometer comprising steps of:
   attaching a fibre optic accelerometer according to any of the above-mentioned embodiments to the vibratory structure,
   optically coupling an optical transmission fibre to the optical fibre of the fibre optical accelerometer,
   applying a broadband light source, e.g. infra-red light source, to the optical transmission fibre,
   detecting a wavelength of reflected light from the fibre optical accelerometer,
   determining an acceleration of the fibre optical accelerometer by demodulating the wavelength of the reflected light.

According to this methodology, acceleration read-out is performed in the optical domain so as to create insensitivity to electromagnetic and mechanical interference, good multiplexing capability and support of extended lengths of connecting cabling. A vibration detection system may comprise a plurality of fibre optic accelerometers that are cascaded or daisy-chained if the fibre optic accelerometers comprise both optical inlets and outlets allowing incoming broad band light to pass through each of the of fibre optic accelerometers. The wavelength of reflected light from each of the plurality of fibre optic accelerometers may be individually tuned to differing wavelengths to allow individual detection or demodulation of the reflected light for any particular fibre optic accelerometer.

BRIEF DESCRIPTION OF THE DRAWINGS

A preferred embodiment of the invention will be described in more detail in connection with the appended drawings, in which.

DESCRIPTION OF PREFERRED EMBODIMENTS

Figure 1:
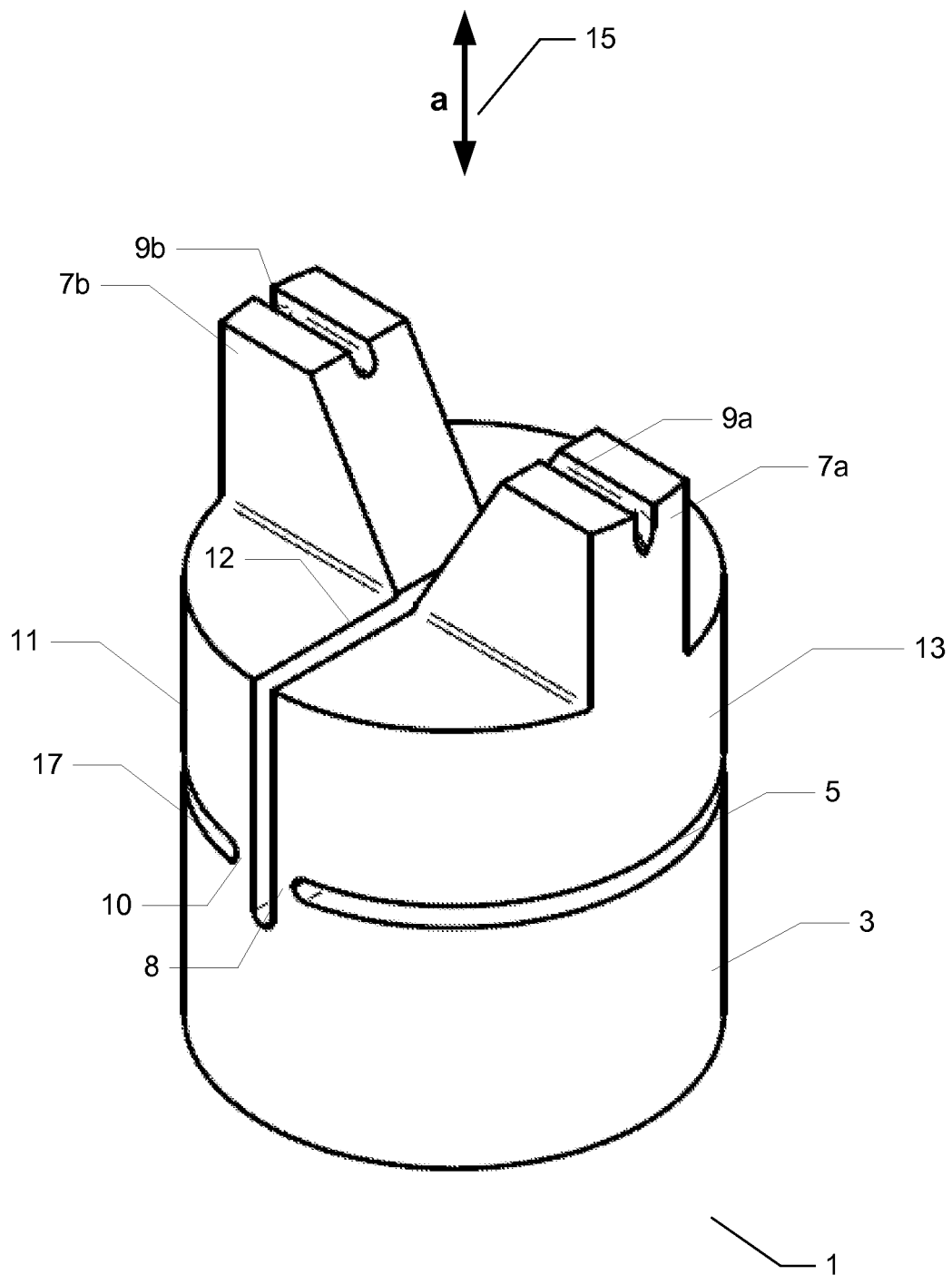
FIG. 1 is a 3D perspective view of a fibre optical accelerometer core for use in a fibre optical accelerometer according to a first embodiment of the invention, FIGS. 2a) and 2b) are front and side view schematic drawings of the fibre optical accelerometer core depicted on FIG. 1.

FIG. 1 depicts a fibre optical accelerometer core 1 according to a first embodiment of the invention. The fibre optical accelerometer core 1 or core comprises an essentially cylindrical or disc shaped base structure 3 movably coupled to a first seismic mass 13 through a first hinge element 8. A second seismic mass 11 is likewise movably coupled to the base structure 3 through a second hinge element 10. The first seismic mass 13 comprises two integrally formed parts in form of a lower semi-cylindrical disc 13 and a lever 7a protruding from the lower semi-cylindrical disc 13 along a vertical axis (not shown) of fibre optical accelerometer core 1. A similarly shaped second seismic mass 11 comprises two integrally formed portions in form of a lower semi-cylindrical disc and another or second lever 7b extending from the lower semi-cylindrical disc along the vertical axis (not shown) of fibre optical accelerometer core 1.

The first hinge element 8 is formed by a horizontal incision, pinch or cut-out 5 in the first seismic mass 13 and/or in the cylindrically shaped base structure 3. The dimensions of the first hinge element 8 may be adjusted to overall dimensions of the fibre optical accelerometer. By controlling the dimensions and material of each of the hinge elements 8, 10, the compliance or stiffness can be conveniently controlled and adapted to requirements of a particular application. The effect of varying the dimensions of the hinge elements is discussed in further detail in connection with FIG. 5 below.

In the present embodiment of the invention, a width of the hinge element 8 is between 0.25 mm and 0.75 mm while the height or thickness of the hinge element 8 is between 0.5 mm and 1.0 mm. The width is measured along a horizontal plane extending parellelly to the horizontal cut-out 5 from the vertical central base wall formed by a central vertical cut-out 12. The thickness of the hinge element 8 corresponds to the height of the horizontal cut-out 5 measured along the vertical axis (not shown) of fibre optical accelerometer core 1.

A similarly shaped second hinge element 10 is formed by another or second horizontal incision, pinch or cut-out 17 in the second seismic mass 11 and/or in the cylindrically shaped base structure 3. The dimensions of the second hinge element 10 are preferably identical to those of the first hinge element 8.

A flat top portion of the lever 7a of the first seismic mass 13 comprises a horizontally extending groove 9a shaped and sized for receipt of an optical fibre (not shown) extending horizontally through the groove 9a and through a correspondingly shaped groove 9b engraved in a flat top portion of the second lever 7b of the second seismic mass 11. The optical fibre is firmly attached or coupled to the first seismic mass 13 at a first attachment joint extending at least partially through the groove 9a by an appropriate attachment mechanism such as gluing, welding, crimping, press-fitting, soldering etc. Another portion of optical fibre is likewise firmly attached or coupled to the second seismic mass 11 at a second attachment joint extending at least partially through the groove 9b. Accordingly, when the fibre optical accelerometer core 1 is subjected to reciprocating acceleration along its vertical axis in the direction indicated by arrow 15, the portion of the optical fibre extending horizontally between the first and second levers is subjected to a varying straining force due to an oppositely oriented displacement of the first and second seismic masses 13, 11.

Light reflection at a Fibre Bragg Grating (FBG) region arranged in the portion of the optical fibre extending horizontally between the first and second attachment joints can be used to measure or determine a varying strain force in the optical fibre as explained in additional detail below in connection with the description accompanying FIG. 3.

As illustrated, the fibre optical accelerometer core 1 is preferably symmetrical about a vertical plane extending centrally through the central vertical cut-out 12.

The base structure 3 may have a diameter between 8 mm and 12 mm such as about 10 mm. The corresponding height may lie between 6-12 mm.

The fibre optical accelerometer core 1 is preferably manufactured by machining a single solid metallic piece or chunk of metallic material for example by milling or micromachining so as to provide a unitary or single-piece fibre optical accelerometer core 1. The metallic piece or chunk may comprise wolfram, stainless steel, brass, copper or titanium. This integral formation of the first and second seismic masses 13, 11 (including the first and second levers 7a, 7b, the first and second hinge elements 8, and the base structure 3 support a highly time and cost effective fabrication methodology eliminating handling and assembly steps of the many small separate components or parts of traditional accelerometer structures.

FIGS. 2a) and 2b) are schematic 2-D front and side views of the fibre optical accelerometer core 1 depicted on FIG. 1. The first and second hinge elements 8, 10 are arranged in a common horizontal plane indicated by dotted line 20. In the present embodiment of the invention, a center of gravity of the first seismic mass 13 is vertically displaced in an upward direction relative to the common horizontal 20 of the first and second hinge elements 8, 10. Likewise, a center of gravity of the second seismic mass 11 is vertically displaced in an upward direction relative to the common horizontal plane 20.

Figure 3:
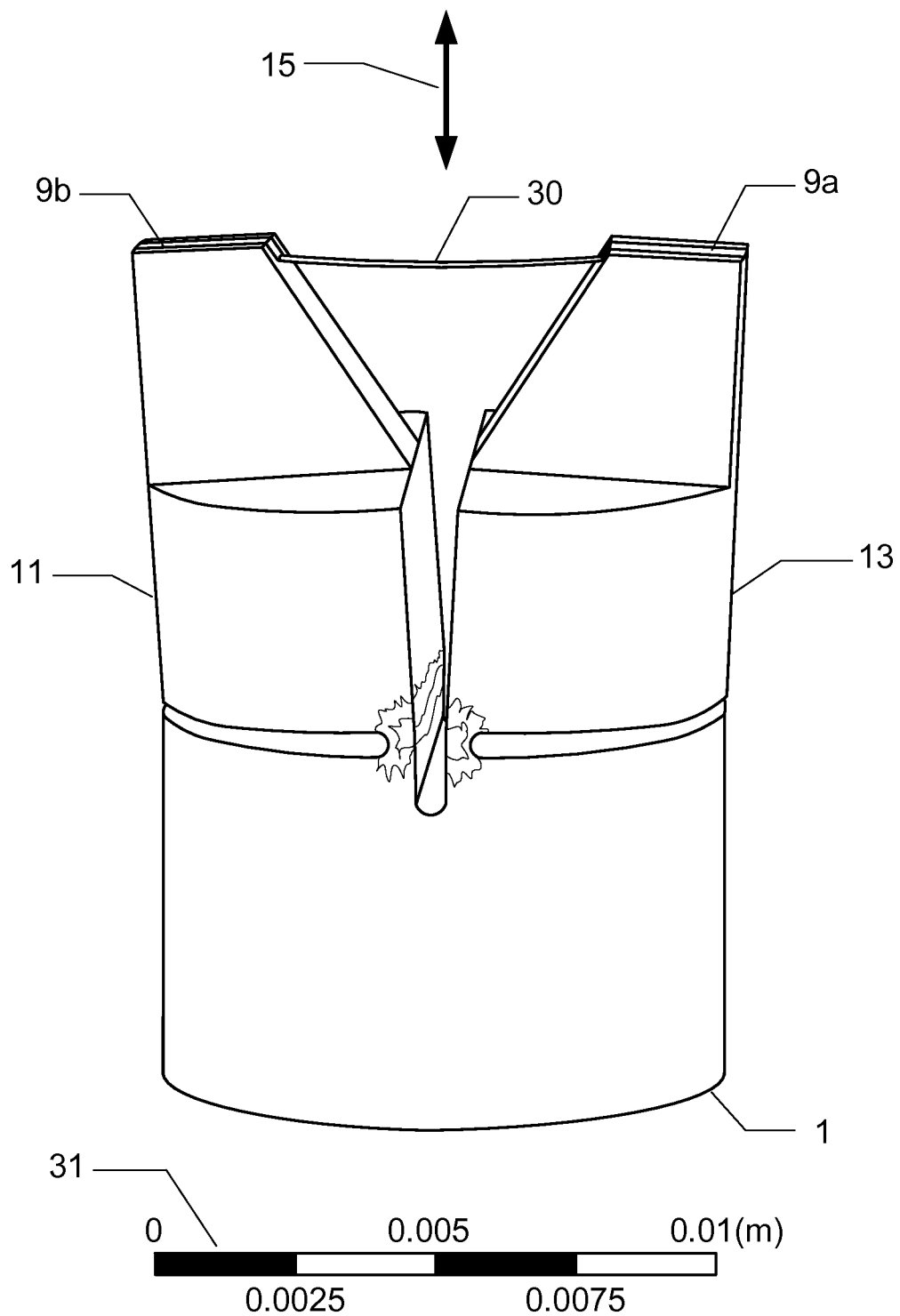
FIG. 3 is a 3D perspective view of the fibre optical accelerometer core depicted on FIGS. 1 and 2 mounted with an optical fibre, FIGS. 4a) and 4b) are 3D perspective views of a fibre optical accelerometer core according to a second embodiment of the invention.

FIG. 3 is a scaled drawing of a 3D perspective view of the fibre optical accelerometer core 1 mounted with an optical fibre 30. The dimensions of the fibre optical accelerometer core 1 are indicated on scale 31 where the displayed values are in units of meters.

A strained region of the optical fibre 30 extending between the first and second attachment joints on the first and second levers 9a, 9b, respectively, comprises a Fibre Bragg Grating (FBG). The FBG is used to detect the varying strain of the optical fibre as a measure of the accelerometer acceleration along the vertical axis 15 being the sensitivity axis of the present accelerometer. The optical fibre 30 is preferably pretensioned so that a predetermined strain is imparted to the optical fibre. The operation of the fibre optical accelerometer is as follows: when acceleration is applied to the fibre optical accelerometer along the vertical axis 15, the first and second seismic masses 13, 11 are displaced about their respective hinge elements. The first and second attachment joints 9a, 9b are in response displaced in opposite substantially horizontal directions so as to approach or move away from each other. This movement is transformed to a reduction or increase of the strain in the strained fibre region 30 comprising the FBG. This varying strain is detectable by measuring a wavelength change of reflected light from the FBG. The reflected light may be attributable to incident light generated by a broadband light source, for example comprising a 1550 nm LED, located remotely from the fibre optical accelerometer. The incident broadband light may have been transmitted to the fibre optical accelerometer through a transmission optical fibre coupled to the fibre optical accelerometer. The transmission fibre is thus responsible for conveying both the incident broadband light to the fibre optical accelerometer and returning narrowband reflected light from the fibre optical accelerometer. Alternatively, an absorption dip in the transmitted broadband light may be detected to determine the wavelength change induced by the FBG.

The wavelength of the narrow-band reflected light can be determined from equation (1) below:

$$\frac{\Delta\lambda}{\lambda_0} = (1-\zeta)\varepsilon \quad (1)$$

wherein:
$\Delta\lambda$=Change in reflected wavelength;
$\lambda_0$=Reflected wavelength under strain-free conditions;
$\zeta$=Elasto-optical coefficient (relative refractive index change under strain);
$\varepsilon$=Longitudinal strain of the optical fibre.

Figure 4:
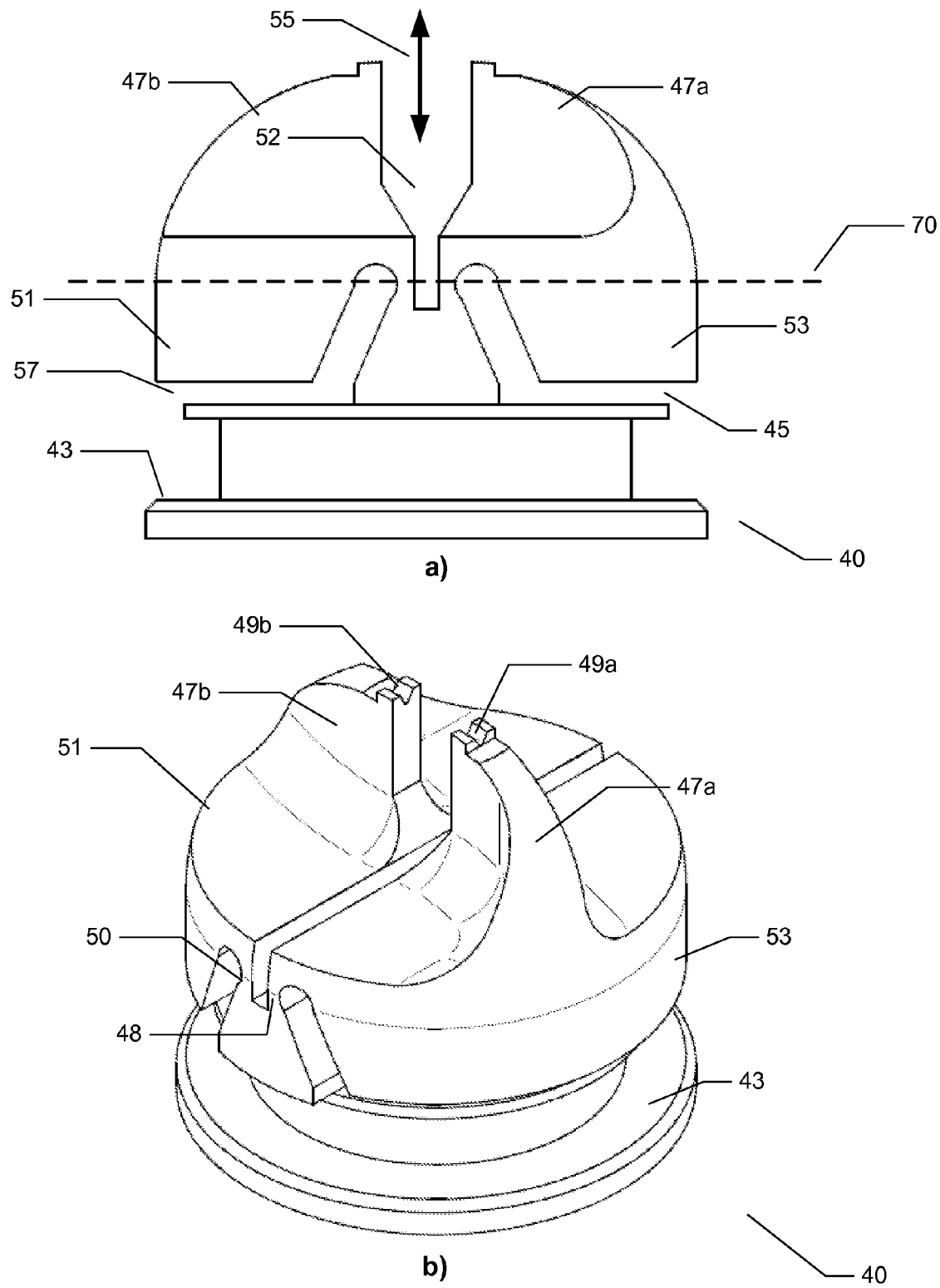

FIG. 4a) is a side view of a fibre optical accelerometer core 40 according to a second embodiment of the present fibre optical accelerometer and FIG. 4b) is 3D perspective view of the second embodiment of the fibre optical accelerometer core 40.

In comparison with the first embodiment of the invention, the present fibre optical accelerometer core 40 provides a reduction of cross-axial acceleration sensitivity, i.e. acceleration in a direction perpendicular to the indicated direction of acceleration along vertical arrow 55 on FIG. 4a).

The fibre optical accelerometer core 40 or core on FIG. 4b) comprises a stepped cylindrical or disc shaped base structure 43 movably coupled to a first seismic mass 53 through a first hinge element 48. A second seismic mass 51 is likewise movably coupled to the stepped disc shaped base structure 43 through a second hinge element 50. The first seismic mass 53 comprises two integrally formed parts in form of a lower irregular generally semi-cylindrical disc and a lever 47a protruding from the lower semi-cylindrical disc along a vertical axis (not shown) of fibre optical accelerometer core 40. A similarly shaped second seismic mass 51 comprises two integrally formed portions in form of a lower irregular generally semi-cylindrical disc and another or second lever 47b extending from the lower semi-cylindrical disc 51 along the vertical axis (not shown) of fibre optical accelerometer core 40.

A first hinge element 48 is formed by an incision, pinch or cut-out 45 in the first seismic mass 53 and/or in the stepped disc shaped base structure 43.

The dimensions of the first hinge element 48 may be adjusted to overall dimensions of the fibre optical accelerometer. By controlling the dimensions and material of each of the hinge elements 48, 50, the compliance or stiffness can be conveniently controlled and adapted to requirements of a particular application.

A similarly shaped second hinge element 50 is formed by another or second incision, pinch or cut-out 57 (refer to FIG. 4b)) in the second seismic mass 11 and/or in the cylindrically shaped base structure 3. The dimensions of the second hinge element 50 are preferably identical to those of the first hinge element 48. A top portion of the first lever 47a of the first seismic mass 53 comprises a horizontally extending groove or indent 49a shaped and sized for receipt of an optical fibre (not shown) extending horizontally through the groove 9a and through a correspondingly shaped groove 49b engraved in a top portion of the second lever 47b of the second seismic mass 51. When mounted the optical fibre 30 is firmly attached or coupled to the first seismic mass 53 at a first attachment joint extending at least partially through the groove 49a by an appropriate attachment mechanism such as gluing, welding, crimping soldering etc. Another portion of optical fibre is likewise firmly attached or coupled to the second seismic mass 51 at a second attachment joint extending at least partially through the second groove 49b. As previously explained in connection with the first embodiment of the invention when the fibre optical accelerometer core 40 is subjected to reciprocating acceleration along the vertical axis indicated by arrow 55, the strained portion of the optical fibre extending horizontally between the first and second levers 47a, 47b is subjected to a variable straining force. The variable straining force is caused by the oppositely directed essentially horizontal displacement of the first and second attachment joints caused by the oppositely oriented displacement of the first and second seismic masses 53, 51 around their respective hinge elements in response to the acceleration.

The first and second hinge elements 48, 50 are arranged in a common horizontal plane indicated by dotted line 70 on FIG. 4a). In comparison with the first embodiment, the present embodiment has a center of gravity of the first seismic mass and a center of gravity of the second seismic mass arranged in the common horizontal plane 70 that also comprises the first and second hinge elements 48, 50. This effectively minimizes cross-axial sensitivity, i.e. sensitivity to acceleration directed along the dotted line 70, of the fibre optical accelerometer since displacement of the first and second seismic masses 53, 51 is largely prevented under such conditions.

An outer surface of the first seismic mass 53 may comprise an engraved shallow guiding channel (not shown) for the optical fibre locking the optical fibre in place from the attachment joint 49a down to a connection point near the base 43. A corresponding shallow guiding channel is also engraved in the outer surface of the second seismic mass 51. The shallow guiding channels are beneficial for several purposes in supporting and maintaining an appropriately limited radius of curvature of the guided portion of the optical fibre in addition to guiding the optical fibre in a well-defined manner down-to the stepped cylindrical or disc shaped base structure 43 of the fibre accelerometer where the optical fibre may be curled up.

Figure 2:
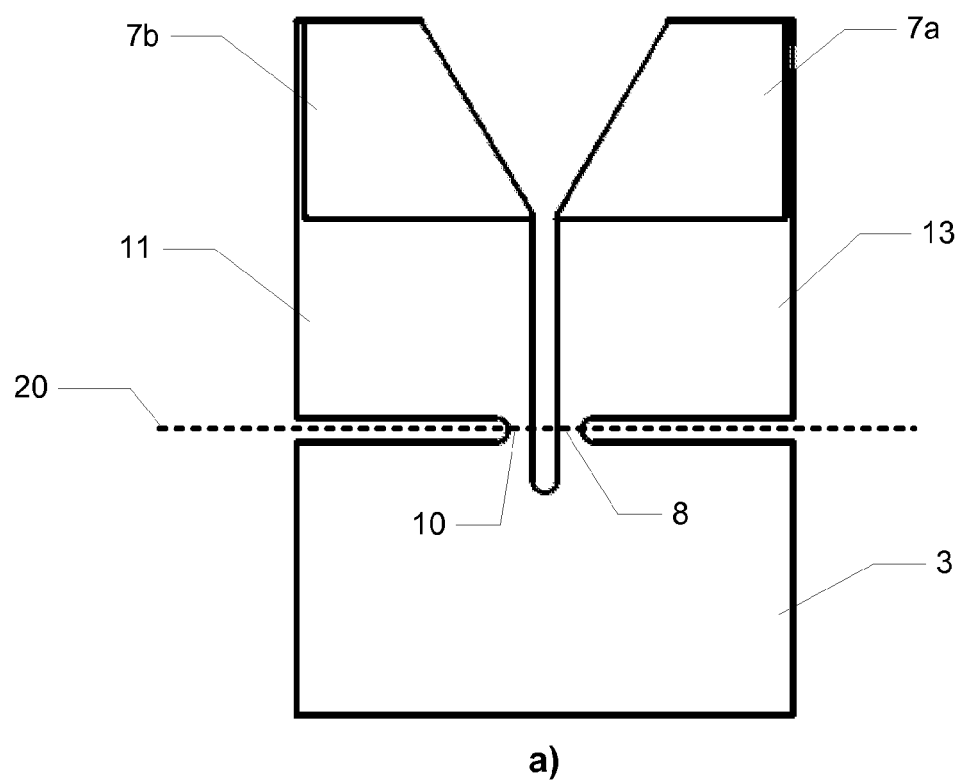
Figure 2:
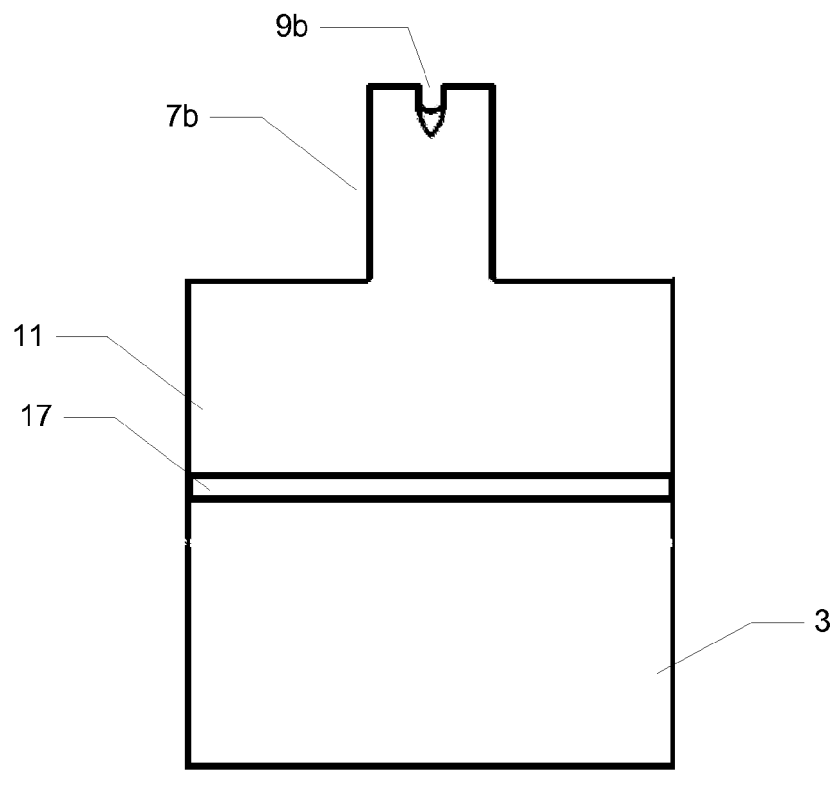
Figure 5:
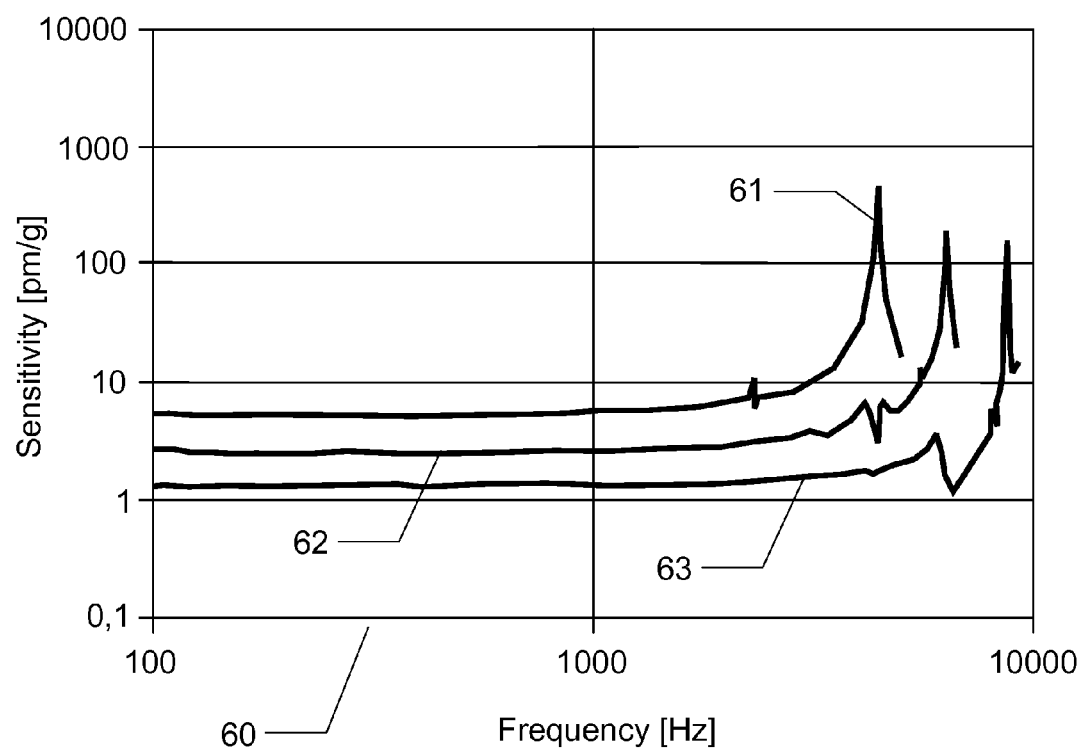
FIG. 5 is a plot of accelerometer output sensitivity versus frequency for the fibre optical accelerometer based on the core depicted on FIGS. 1-2 in three different variants with differing dimensions of hinge elements.

FIG. 5 is a plot 60 of measured accelerometer output sensitivity versus frequency for an experimental fibre optical accelerometer based on the core depicted in FIGS. 1-2. The fibre optical accelerometer was subjected to a predetermined acceleration in vertical direction, i.e. in the direction indicated by arrow 15 of FIG. 1, which is the axis of maximum sensitivity. Three different variants of the experimental fibre optical accelerometer core 1 were fabricated in titanium with differing dimensions of the hinge elements to verify the scalability of the present fibre optical accelerometer. The lower curve 63 was measured on a fibre optical accelerometer core or core with a hinge element thickness or height of 0.5 mm and a width of about 0.75 mm. The middle and upper curves 62, 61, respectively, represent the measured accelerometer output sensitivity for a hinge element width of 0.5 mm and 0.25 mm. As expected, the high frequency resonance of the experimental fibre optical accelerometer decreases with decreasing hinge element width due to an increasing compliance of the hinge element. Likewise, the output sensitivity through the operating frequency range (i.e. well below the high frequency resonance) of the experimental fibre optical accelerometer increases with decreasing hinge element thickness indicating the increasing strain imparted to the optical fibre for a given acceleration. The present adjustment of hinge element width represents just one example demonstrating how performance metrics of the present fibre optical accelerometer in a convenient and efficient manner can be tailored to a particular target metric by changing simple geometrical dimensions of selected features of the fibre optical accelerometer core.

Figure 6:
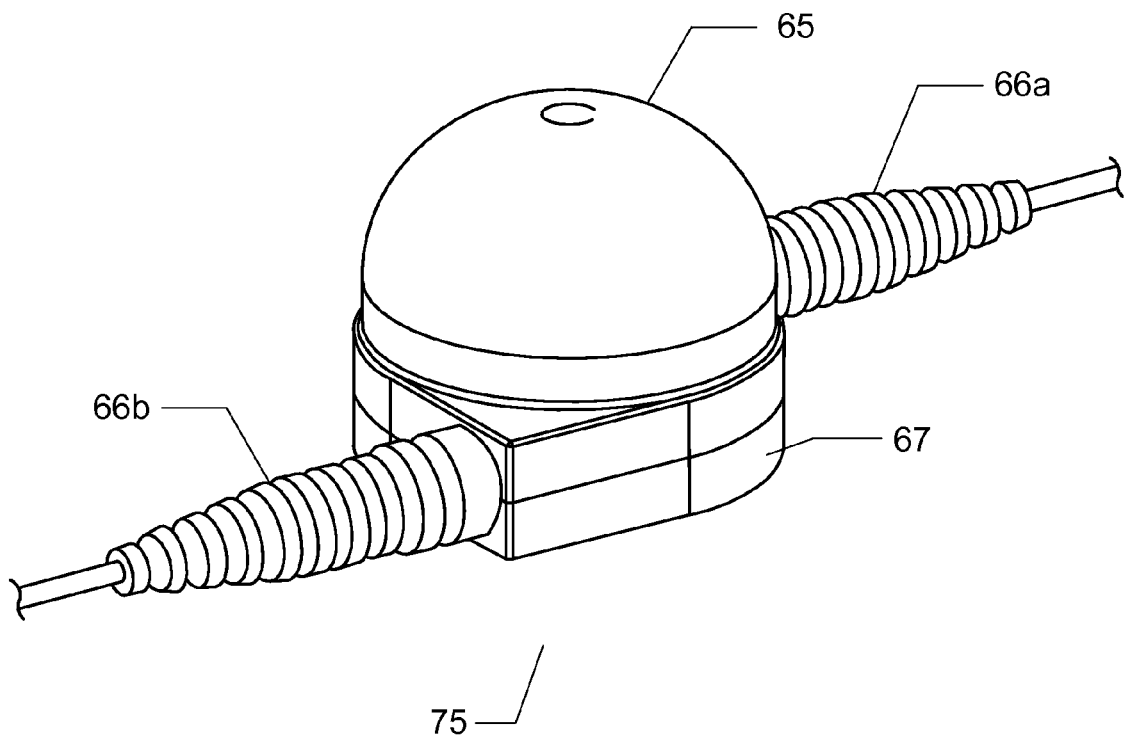
FIG. 6 is a 3D view of a packaged or finished fibre optical accelerometer comprising the accelerometer core depicted on FIGS. 4a) and 4b).

FIG. 6 is a 3D view of a packaged or finished fibre optical accelerometer 75 comprising the accelerometer core 40 depicted in FIGS. 4a) and 4b). A cup-shaped upper housing portion 65 encloses the first and second seismic masses 53, 51 (refer to FIG. 4b)) and the first and second hinge elements 48, 50. The cup-shaped upper housing portion 65 contacts an upper surface of the stepped disc shaped base structure 43 (refer to FIG. 4b)) to encapsulate the core and shield movable and fragile inner components from pollutants in the external environment. A pair of optical fibre connectors (not shown) are enclosed within respective ones of protective elastomeric bushings 66a, 66b shielding the optical fibre connectors against external strain, stress and pollution agents. Each of the optical fibre connectors may comprise an industry standard connector, such as Redel-D miniature optical connector supplied by LEMO®, used to optically couple the strained optical fibre region inside the packaged fibre optical accelerometer 75 to an external remote light source for acceleration read-out purposes. One of the optical fibre connectors can be used as a light outlet connectable to another serially coupled optical fibre accelerometer in a multiplexing arrangement. A lower housing portion 67 encloses a lower portion of the stepped disc shaped base structure 43 (refer to FIG. 4b)) and abuts the cup-shaped upper housing portion 65 to form a complete accelerometer or transducer housing which supports buffered lengths of optical fibre situated between the strained portion of the optical fibre (sensing element) and each of the optical fibre connectors.

The invention claimed is:

1. A fiber optical accelerometer comprising:
a base structure,
a first seismic mass movably coupled to the base structure through a first hinge element,
a second seismic mass movably coupled to the base structure through a second hinge element,
an optical fibre coupled to the first and second seismic masses at first and second attachment joints, respectively, to subject the optical fiber to varying strain by displacement of the first and second seismic masses about the first and second hinge structures, respectively,
wherein the first and second hinge elements are arranged in a common horizontal plane, and
wherein a center of gravity of the first seismic mass and a center of gravity of the second seismic mass are arranged in the common horizontal plane.

2. A fiber optical accelerometer according to claim 1, wherein the first and second seismic masses, the first and second hinge elements and the base structure are formed in the same material.

3. A fiber optical accelerometer according to claim 2, wherein the material comprises a metallic material selected from a group of Wolfram, stainless steel, brass, copper, titanium, silicon.

4. A fiber optical accelerometer according to claim 2, wherein the first and second seismic masses, the first and second hinge elements and the base structure are fabricated from a single solid object by moulding or machining.

5. A fiber optical accelerometer according to claim 4, wherein the first and second hinge elements comprise respective incisions or pinches in the first and second seismic masses adjacent to the base structure.

6. A fiber optical accelerometer according to claim 1, comprising:
    first lever extending between the first seismic mass and the first attachment joint on the optical fiber,
    a second lever extending between the second seismic mass and the second attachment joint on the optical fiber.

7. A fiber optical accelerometer according to claim 1, wherein a distance between the first attachment joint on the optical fiber and the first hinge element is at least two times larger than a distance between a center of gravity of the first seismic mass and the first hinge element.

8. A fiber optical accelerometer according to claim 1, wherein the first and second seismic masses, the first and second hinge elements and the base structure are symmetrically arranged about a central vertical plane.

9. A fiber optical accelerometer according to claim 1, wherein the first and second seismic masses are arranged above a common horizontal plane of the first and second hinge elements toward the optical fiber and the base structure is arranged below the common horizontal plane.

10. A fiber optical accelerometer according to claim 1, wherein a maximum dimension of the base structure in a horizontal plane lies between 4 mm and 40 mm, preferably between 8 mm and 20 mm.

11. A fiber optical accelerometer according to claim 1, having a maximum dimension along a vertical axis between 8 mm and 80 mm.

12. A fiber optical accelerometer according to claim 1, having a mass between 2 gram and 400 gram such as between 5 gram and 100 gram.

13. A fiber optical accelerometer according to claim 1, wherein a strained section of the optical fibre extending between the first and second attachment joints comprises a Fibre Bragg grating (FBG).

14. A fiber optical accelerometer according to claim 1, comprising a transducer housing enclosing and sealing the first and second seismic masses and the first and second hinge elements against an external environment.

15. A method of detecting acceleration of a remote vibratory structure with a fiber optic accelerometer, comprising:
    attaching a fiber optic accelerometer according to claim 1 to the vibratory structure,
    optically coupling an optical transmission fiber to the optical fiber of the fiber optical accelerometer,
    applying a broadband light source to the optical transmission fiber,
    detecting a wavelength of reflected light from the fiber optical accelerometer, and
    determining an acceleration of the fiber optical accelerometer by demodulating the wavelength of the reflected light.

16. The method of claim 15, wherein the broadband light source includes an infra-red light source.

* * * * *